(12) United States Patent
Stebnicki et al.

(10) Patent No.: US 6,758,327 B1
(45) Date of Patent: Jul. 6, 2004

(54) CONVEYOR DRIVE ASSEMBLY AND METHOD OF OPERATION

(75) Inventors: James C. Stebnicki, Milwaukee, WI (US); William J. Bolhuis, South Milwaukee, WI (US); David B. Fork, Mukwonago, WI (US)

(73) Assignee: Rexnord Industries, Inc., Milwaukee, WI (US)

( * ) Notice: Subject to any disclaimer, the term of this patent is extended or adjusted under 35 U.S.C. 154(b) by 0 days.

(21) Appl. No.: 10/337,601

(22) Filed: Jan. 7, 2003

(51) Int. Cl.[7] .................. B65G 23/00; B65G 43/00; B65G 47/00
(52) U.S. Cl. ................ 198/832; 198/502.4; 198/810.01
(58) Field of Search .................... 198/502.1, 502.4, 198/832, 810.01, 810.03

(56) References Cited

U.S. PATENT DOCUMENTS

| | | | |
|---|---|---|---|
| 1,847,152 A | 3/1932 | Webb et al. | |
| 2,625,257 A | 1/1953 | Schenk | |
| 3,989,989 A | 11/1976 | Mayer | |
| 5,295,571 A | 3/1994 | Van Den Bogaert et al. | |
| 5,402,879 A | * | 4/1995 | Briehl ........................ 198/832 |
| 5,954,186 A | 9/1999 | Stroobandt | |
| 6,446,788 B1 | * | 9/2002 | Leidy et al. ............. 198/502.4 |
| 6,594,460 B1 | * | 7/2003 | Williams et al. ....... 198/810.03 |

* cited by examiner

*Primary Examiner*—Gene O Crawford
(74) *Attorney, Agent, or Firm*—Quarles & Brady LLP

(57) ABSTRACT

A conveyor drive assembly including an elongated shaft having a first and second end and method of operating the conveyor drive assembly which reliably controls the speed of each end of the drive shaft and minimizes unequal loading of the conveyor belt. The method includes detecting the rotational position of the first end of the shaft, detecting the rotational position of the second end of the shaft, determining the rotational position of one of the first and second ends relative to the other of the first and second ends, and then rotationally driving at least one of the first and second ends of the shaft to maintain the rotational position of one of the first and second ends relative to the other of the first and second ends within a predetermined range. Advantageously, the present invention provides a conveyor drive assembly for use with wide conveyors which reliably controls the speed of each end of the drive shaft and minimizes unequal loading of the conveyor belt.

23 Claims, 2 Drawing Sheets

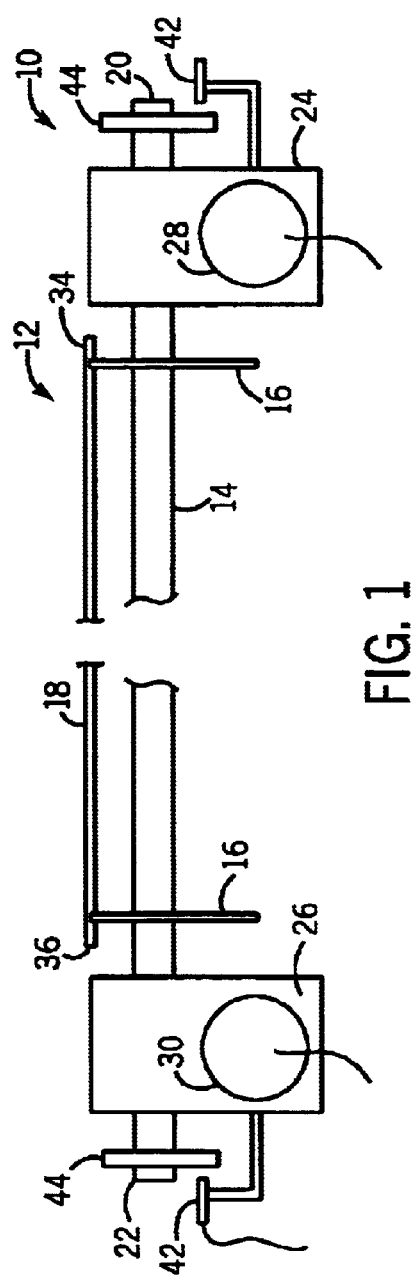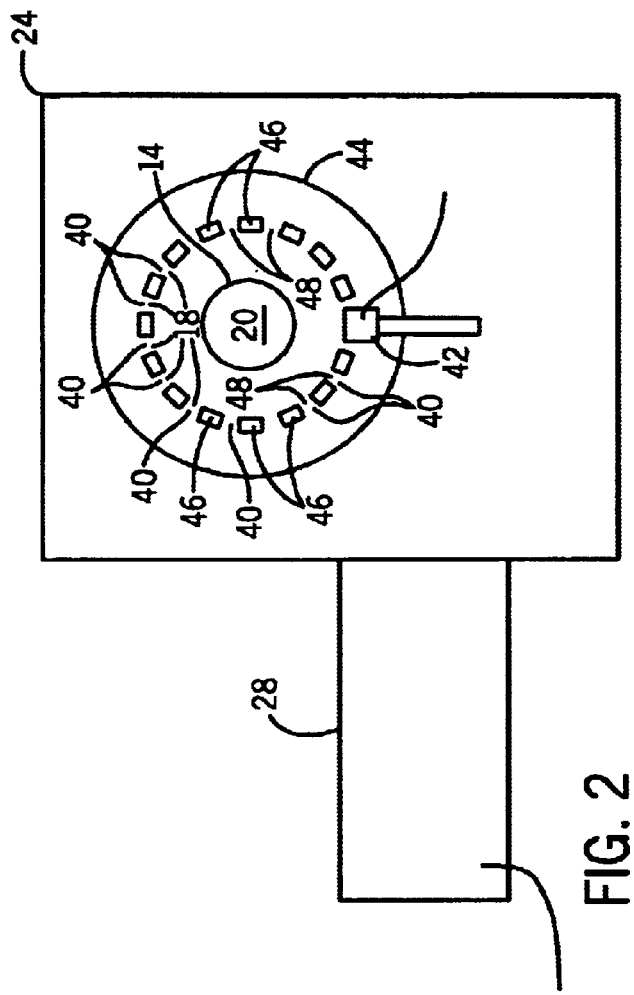

CONVEYOR DRIVE ASSEMBLY AND METHOD OF OPERATION

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The field of invention is conveyor drive assemblies, and more particularly, conveyor drive assemblies including a shaft driven by at least two drive motors.

Conveyor drive assemblies typically include a rotationally driven shaft which rotationally drives one or more sprockets. The sprockets engage an endless belt or chain to drive the belt. Drive shafts for driving relatively narrow conveyor systems, such as less than fifty-four inches wide, typically are rotationally driven by a single drive motor coupled to one end of the shaft.

Wide endless conveyor chains, such as conveyor systems having belt widths greater than ninety-six inches wide, are also typically driven by multiple sprockets on a single drive shaft. The shaft, however, is often driven by at least two drive motors, such as a first drive motor on one end of the shaft and a gearbox or second drive motor on the opposing end of the shaft to minimize the shaft torque load. Advantageously, minimizing the shaft torque load minimizes the required diameter of the shaft which reduces costs.

The rotational speed of the output shaft of each drive motor driving each end of the drive shaft is typically controlled to synchronize both ends of the drive shaft. When controlling the output shaft rotational speed of each of the drive motors driving the drive shaft ends, unless the output shaft rotational speeds of the drive motors are identical, there will almost always be a discrepancy in the radial positions of each drive shaft end. The differences in the output shaft speeds can result in drive shaft twisting wherein one end of the drive shaft leads the other end. The difference in the radial position of the drive shaft ends increases over time, and can result in unequal loading of the conveyor belt.

Typically, the radial positions of each drive shaft end will diverge until system loading equilibrium is reached. At this equilibrium point, the difference in the applied loading of each drive motor is taken up by balancing torque required to twist the drive shaft, torque required to drive the conveyor chain or belt, and other mechanical losses. In extreme cases, it is possible that one drive motor can lead the other drive motor to the extent that the leading drive motor could back drive the lagging drive motor. Moreover, the difference between the drive shaft end radial positions can cause the conveyor chain to be driven from one side only. This unequal loading can cause catastrophic failures in the conveyor system.

The force applied to the conveyor belt at particular points can be measured to prevent catastrophic failures resulting from unequal loading of the belt. Methods for measuring the force applied to the belt include using load cells which measure the force or measuring the torque applied to each end of the drive shaft. Typically, load cells and torque data are used to limit the conveyor system by shutting down the system if a predetermined load or torque limit is exceeded.

The data provided by the torque measurements or load cells can, however, be used to control the rotational speed of each drive shaft end. In order to use the data, however, many theoretical assumptions must be made to control the rotational speed of the shaft. In addition, it is quite feasible that the top loading of the conveyor belt or chain is not equal across the width. Because of this, the loading can fluctuate continuously, causing a system to never calculate an equilibrium speed.

The drive sprockets on a conveyor chain or belt can also cause fluctuations in torque measurements due to the chordal nature of the chain or belt pitch. The fluctuations can cause the system to continuously adjust the rotational speed of the drive motor output shaft which accelerates the deterioration of the system and increases maintenance costs. Therefore, a need exists for a conveyor drive assembly for wide conveyor systems and method of operation which reliably controls the speed of each end of the drive shaft and minimizes unequal loading of the conveyor belt.

BRIEF SUMMARY OF THE INVENTION

The present invention provides a conveyor drive assembly including an elongated shaft having a first and second end and a method of operating the conveyor drive assembly. The method includes detecting the rotational position of the first end of the shaft, detecting the rotational position of the second end of the shaft, determining the rotational position of one of the first and second ends relative to the other of the first and second ends, and then rotationally driving at least one of the first and second ends of the shaft to maintain the rotational position of one of the first and second ends relative to the other of the first and second ends within a predetermined range. Advantageously, the present invention provides a conveyor drive assembly for use with wide conveyors which reliably controls the speed of each end of the drive shaft and minimizes unequal loading of the conveyor belt.

A general objective of the present invention is to provide a conveyor drive assembly and method of operation which does not rely on measuring the rotational speed or torque of the drive motor output shaft or drive shaft to minimize unequal belt or chain loading. The present invention accomplishes this objective by monitoring and controlling the rotational position of one drive shaft end relative to the other drive shaft end.

Another objective of the present invention is to provide a conveyor drive assembly and method of operation which reliably controls the rotational speed of each end of the drive shaft. This objective is accomplished by directly monitoring the radial position of each shaft end.

The foregoing and other objectives and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 1 is a cross sectional view of a wide conveyor drive shaft assembly incorporating the present invention;

FIG. 2 is a detailed cross sectional view of one end of the conveyor drive shaft assembly of FIG. 1;

DETAILED DESCRIPTION OF THE PREFERRED EMBODIMENTS

Figure 3:
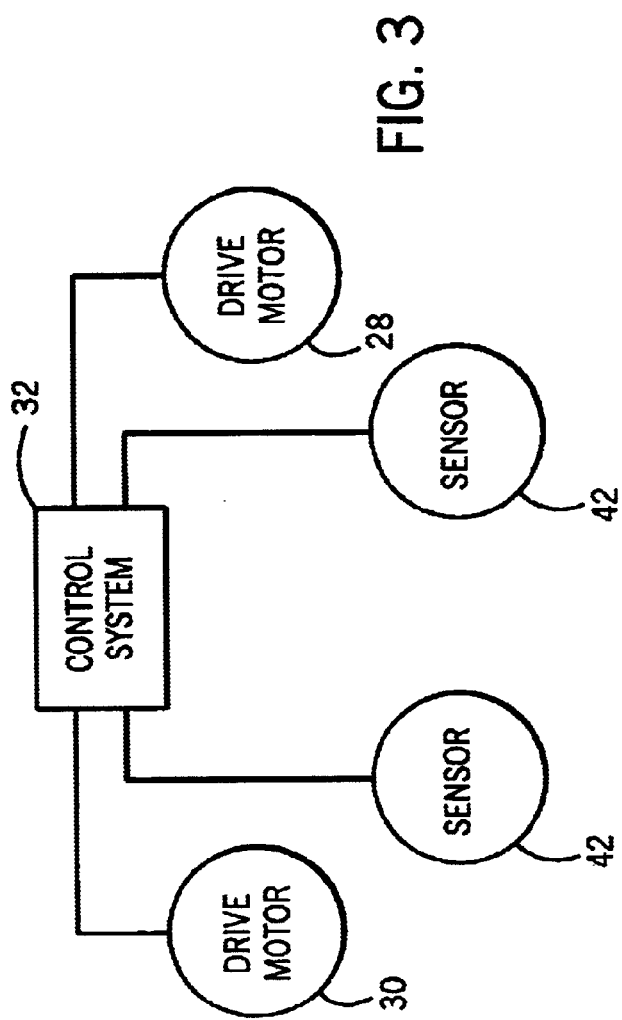
FIG. 3 is a block diagram of the control system of the conveyor drive shaft assembly of FIG. 1.

As shown in FIGS. 1–3, a conveyor drive assembly 10 for a wide belt conveyor system 12 includes an elongated drive shaft 14 which rotationally drives a plurality of drive sprockets 16. Each sprocket 16 engages a conveyor belt 18 to drive the belt 18 along a conveyor path. Each end 20, 22 of the drive shaft 14 is rotationally driven by a gearbox 24, 26 driven by a drive motor 28, 30. Each drive motor 28, 30 is independently controlled by a control system 32 which monitors and controls the rotational position of each end 20, 22 of the drive shaft 14 to minimize unequal loading of the conveyor belt 18. The gearboxes 24, 26 including intermeshing gears (not shown) and drive motors 28, 30 comprise a drive train rotationally driving the shaft 14.

The drive shaft 14 is any conventional shaft known in the art formed from steel, or other material, having the desired torsional characteristics for rotationally driving one or more sprockets 16. The first end 20 of the shaft 14 extends past a side edge 34 of the conveyor belt 18 and the opposing second end 22 of the shaft 14 extends past the opposing side edge 36 of the conveyor belt 18.

Each end 20, 22 of the shaft 14 is rotationally driven by the drive motor 28, 30 coupled to the respective shaft end 20, 22 by one of the gearboxes 24, 26. Advantageously, each gearbox 24, 26 couples the respective drive motor 28, 30 to the respective shaft end 20, 22 to more precisely control the shaft 14 rotational speed.

Each drive motor 28, 30 is controlled by the control system 32 described in more detail below. Any drive motor known in the art, such as a two or three phase electric motor, gas powered engine, and the like can be used without departing from the scope of the invention. Preferably, each drive motor is selected using methods known in the art to provide sufficient rotational force for the anticipated conveyor load.

A set of timing marks 40 proximal each shaft end 20, 22 provide references for determining the rotational location of each shaft end 20, 22. Although a plurality of timing marks is disclosed, a set of timing marks can include one or more timing marks without departing from the scope of the invention. Preferably more than one timing mark proximal each shaft end 20, 22 is provided to provide greater resolution of the radial position of each shaft end 20, 22. In addition, although axially facing timing marks are shown, timing marks can be formed on the outer radial surface of the shaft is within the meaning of proximal the shaft end.

Each timing mark 40 can be any detectable mark known in the art, and depends upon the type of detector 42 used to detect the mark 40. For example, a strip of reflective material can be adhesively fixed proximal each shaft end that can be detected by a sensor that detects light reflected by the reflective material. Magnetic material detectable by a magnetic or inductive sensor, extensions which can trip a limit switch or inductive sensor, and the like can also be used as timing marks without departing from the scope of the invention.

In a preferred embodiment disclosed in FIGS. 1–3, the timing marks 40 are formed in an annular steel disk 44 fixed to, and extending radially from, the drive shaft 14. Slots 46 formed in the disk 44 are equidistantly spaced from the drive shaft axis to define ribs 48. The disk 44 rotates coaxially with the drive shaft 14, and the ribs 48 are detectable by the detector 42, such as an inductive proximity sensor described below. In an alternative embodiment, the slots open to the circumferential edge of the disk to define radially extending fingers that can be detected by the detector. Of course, the slots 46 could also be used as timing marks if an appropriate detector, such as a photoelectric sensor, is used.

Each timing mark 40 is detected by the detector 42 capable of detecting the mark 40 and sending a signal to the control system 32 indicating a detection has occurred. The type of detector is dependent upon the type of timing mark used, and can be any commercially available detector without departing from the scope of the invention. In the preferred embodiment disclosed in FIGS. 1 and 2, the detector is an inductive proximity sensor, such as a Short Barrel Inductive Proximity Sensor, Model No. E2E-X5E1-N available from Omron Electronics, LLC, Schaumburg. Ill., which can detect the steel ribs 48 formed in the annular disk 44 between adjacent slots 46, as the disk 44 rotates.

The signal provided by each detector 42 is received by the control system 32 electrically connected to the detectors 42, and analyzed to determine the relative position of one shaft end 20 relative to the other shaft end 22. Preferably, the control system 32 includes at least one control device known in the art having a CPU, such as a microcomputer, programmable logic controller, personal computer, and the like, which can receive and analyze the signals from the detectors 32 and then modify the drive motor parameters to change the speed of at least one of the drive motors 28, 30 electrically connected to the control system 32 to minimize the difference between radial positions of the shaft ends 20, 22.

In the preferred embodiment, a control loop operating on the control system control device monitors the radial position of the drive shaft ends 20, 22, and provides feedback to the drive motors 28, 30 to adjust the rotational speed of at least one end 20, 22 of the shaft 14. The control loop determines the relative position of one shaft end 20 relative to the other shaft end 22 by calculating the time between receipt of the signal provided by each detector 42 for a specific timing mark proximal each shaft end 20, 22. The time between receipt of specific signals is directly proportional to the difference in rotational position between the shaft ends 20, 22.

The control loop maintains the difference in radial position between the shaft ends 20, 22 within an acceptable range. Although, the acceptable range for the difference in radial position can depend upon the drive shaft diameter, drive shaft length, desired drive shaft rotational speed, whether the drive shaft is starting up the conveyor, whether the drive shaft has reached, or is approaching, steady state, and the resolution available from the timing marks. Preferably, however, the difference in radial position does not exceed approximately 2° under steady state conditions.

In use, the sensors 42 detect the timing marks 40 to determine the radial position of each end 20, 22 of the shaft 14 as the shaft 14 rotates. Each sensor transmits signals to the control system 32 running the control loop which compares the radial position of one end 20 of the shaft 14 to the radial position of the other end 22 of the shaft 14. If the difference between the radial positions of the shaft ends 20, 22 is within a required positional tolerance (i.e. within a predetermined range), the drive motor parameters are not altered. If the positional tolerance is exceeded, the control loop increases or decreases the speed of one of the drive motors 28 driving one end 20 of the shaft 14 to reduce the difference between the radial position of the one shaft end 20 relative to the radial position of the other shaft end 22.

The drive motors 28,30 can be adjusted using a master-slave relationship in which the rotational speed of one drive motor 28 is modified relative to the rotational speed of other drive motor 30 to maintain the relative radial position of the drive shaft ends 20, 22 within the positional tolerance. Alternatively, the drive motor speeds can be modified relative to each other within a prescribed speed range for the drive motor output shafts to maintain the radial positions of the drive shaft ends 20, 22 within the positional tolerance.

Advantageously, measuring the radial position of the shaft ends 20, 22 and using that information to control the rotation of the shaft 14 is more effective than using a measured rotational shaft speed to control the rotational speed of the shaft 14. Moreover, monitoring the relative radial position of the shaft ends 20, 22 to control the rotational speed of each shaft end 20, 22 assures that the torque applied to the shaft 14 is more equally spread across the belt width to avoid driving one side of the belt faster or slower than the other side of the belt.

Figure 4:
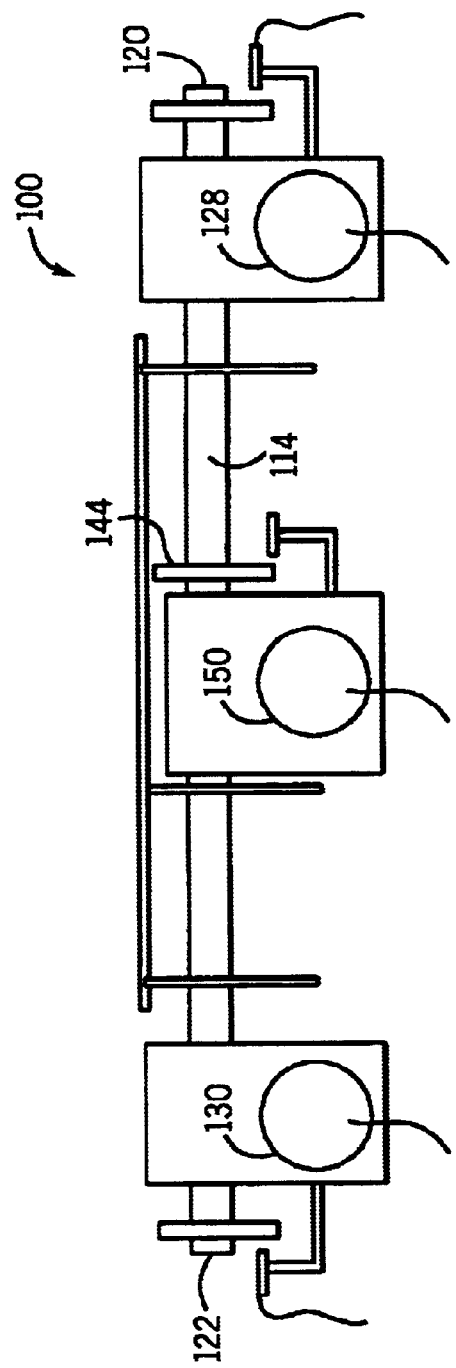
FIG. 4 is a cross sectional view of an alternative wide conveyor drive shaft assembly incorporating the present invention.

In an alternative embodiment shown in FIG. 4, the present invention can be used with a multiple drive conveyor drive system 100 (more than two drives). In the multiple drive conveyor drive system 100, a drive motor 128, 130 drives each end 120, 122 of a shaft 114, as described above, and one or more intermediate drive motors 150 drive the shaft 114 at locations interposed between the shaft ends 120, 122.

In the alternative embodiment described herein, an annular disk 144 having one or more timing marks formed therein is fixed to the shaft 114 proximal each intermediate drive location, and the control system, such as described above, monitors the radial position of the shaft 114 at each location and controls the drive motors 128, 130, 150 to minimize the difference between the radial positions of the shaft 114 at each location. In multiple drive conveyor drive systems, such as described herein, it is preferred to monitor one drive motor location as a baseline (master), and control the other motor drive locations (slaves) to match the baseline within a predetermined tolerance.

In another alternative embodiment, if monitoring the radial position of the drive shaft is not possible, the radial position of the output shaft of each drive, or other rotating member of the drive train, can be monitored instead. Monitoring the output shaft or other rotating member of the drive train, however, is not preferred, because the connection between the output shaft and drive shaft may require increasing the allowable positional tolerances.

While there have been shown and described what is at present considered the preferred embodiments of the invention, it will be obvious to those skilled in the art that various changes and modifications can be made therein without departing from the scope of the invention defined by the appended claims.

We claim:

1. A conveyor drive assembly comprising:
   an elongated drive shaft having a first end and a second end;
   a first drive motor rotationally driving said first end;
   at least one first timing mark fixed to said shaft proximal said first end;
   a first sensor detecting said at least one first timing mark, and producing a first signal indicating detection of said at least one first timing mark;
   a second drive motor rotationally driving said second end;
   at least one second timing mark fixed to said shaft proximal said second end;
   a second sensor detecting said at least one second timing mark, and producing
   a second signal indicating detection of said at least one second timing mark; and
   a control system receiving said first and second signals and determining the rotational position of one of said first and second ends relative to the other of said first and second ends.

2. The conveyor drive assembly as in claim 1, in which said shaft rotationally drives at least one sprocket engaging a conveyor belt.

3. The conveyor drive assembly as in claim 1, including at least one intermediate drive motor rotationally coupled to said shaft at a location between said first end and said second end to rotationally drive said shaft.

4. The conveyor drive assembly as in claim 3, including at least one intermediate timing mark fixed to said shaft proximal said at least one intermediate drive motor, and including an intermediate sensor detecting said at least one intermediate timing mark, said intermediate sensor producing a detection signal indicating detection of said at least one intermediate timing mark, wherein said control system receives said detection signal and calculates the rotational position of said shaft at said location relative to the other of said first and second ends.

5. The conveyor drive assembly as in claim 1, in which said at least one first timing mark is a plurality of apertures formed in an annular disk extending radially from said shaft.

6. The conveyor drive assembly as in claim 5, in which said first sensor is an inductive proximity sensor which senses portions of said disk between adjacent slots.

7. The conveyor drive system assembly as in claim 1, in which said control system includes a control loop which monitors the rotational position of one of said first and second ends relative to the other of said first and second ends and modifies the rotational speed of at least one of said first and second motor drives to maintain the rotational position of one of said first and second ends relative to the rotational position of the other of said first and second ends within a predetermined range.

8. The conveyor drive system as in claim 1, in which said predetermined range provides a difference in the rotational positions of the first and second ends of less than 2°.

9. The conveyor drive assembly as in claim 8, in which said control loop reduces the rotational speed of one of said first and second ends to maintain the rotational position of one of said first and second ends relative to the rotational position of the other of said first and second ends within a predetermined range.

10. A method of controlling a conveyor drive assembly including an elongated shaft having a first end and a second end, said method comprising:
    detecting the rotational position of the first end of the shaft;
    detecting the rotational position of the second end of the shaft;
    determining the rotational position of one of said first and second ends relative to the other of said first and second ends; and
    rotationally driving at least one of said first and second ends of said shaft to maintain the rotational position of one of said first and second ends relative to the other of said first and second ends within a predetermined range.

11. The method of controlling a conveyor drive system as in claim 10, in which rotationally driving at least one of said first and second ends of said shaft to maintain the rotational position of one of said first and second ends relative to the other of said first and second ends within a predetermined range includes decreasing the rotational speed of a drive motor rotationally driving one of said first and second ends.

12. The method of controlling a conveyor drive system as in claim 10, in which rotationally driving at least one of said first and second ends of said shaft to maintain the rotational position of one of said first and second ends relative to the other of said first and second ends within a predetermined range includes increasing the rotational speed of a drive motor rotationally driving one of said first and second ends.

13. The method of controlling a conveyor drive system as in claim 10, in which rotationally driving at least one of said first and second ends of said shaft to maintain the rotational position of one of said first and second ends relative to the other of said first and second ends within a predetermined range includes maintaining the rotational position of one of said first and second ends within 2° of the other of said first and second ends.

14. The method of controlling a conveyor drive system as in claim 10, including detecting the rotational position of said shaft at at least one intermediate location between said first and second ends, and determining the rotational position of said one of said first and second ends relative to said at least one location.

15. The method of controlling a conveyor drive system as in claim 10, in which detecting the rotational position of the first end of the shaft includes detecting at least one timing mark formed in an annular disk extending radially from said shaft.

16. The method of controlling a conveyor drive system as in claim 15, in which said at least one timing mark is detected by an inductive proximity sensor.

17. A conveyor drive assembly comprising:
an elongated drive shaft having a first end and a second end;
a sprocket rotationally driven by said shaft and engagable with a conveyor belt for driving said conveyor belt;
a first drive motor rotationally driving said first end;
at least one first timing mark fixed to said shaft proximal said first end;
a first sensor detecting said at least one first timing mark, and producing a first signal indicating detection of said at least one first timing mark;
a second drive motor rotationally driving said second end;
at least one second timing mark fixed to said shaft proximal said second end;
a second sensor detecting said at least one second timing mark, and producing
a second signal indicating detection of said at least one second timing mark; and
a control system receiving said first and second signals and determining the rotational position of one of said first and second ends relative to the other of said first and second ends, in which said control system includes a control loop which monitors the rotational position of one of said first and second ends relative to the other of said first and second ends and modifies the rotational speed of at least one of said first and second motor drives to maintain the rotational position of one of said first and second ends relative to the rotational position of the other of said first and second ends within a predetermined range.

18. The conveyor drive system as in claim 17, in which said predetermined range provides a difference in the rotational positions of the first and second ends of less than 2°.

19. The conveyor drive assembly as in claim 17, including a third drive motor rotationally coupled to said shaft between said first end and said second end to rotationally drive said shaft.

20. The conveyor drive assembly as in claim 19, including at least one third timing mark fixed to said shaft proximal said location, and including a third sensor detecting said at least one third timing mark, said third sensor producing a third signal indicating detection of said at least one third timing mark, wherein said control system receives said third signal and calculates the rotational position of said location relative to the other of said first and second ends.

21. A conveyor drive assembly comprising:
an elongated drive shaft having a first and second end;
a first drive train rotationally driving said first end, said first drive including at least one rotating member;
at least one first timing mark fixed to at least of said at least one rotating member of said first drive train and said drive shaft proximal said first end;
a first sensor detecting said at least one first timing mark, and producing a first signal indicating detection of said at least one first timing mark;
a second drive train rotationally driving said second end, said second drive train including at least one rotating member;
at least one second timing mark fixed to at least one of said at least one rotating member of said second drive train and said drive shaft proximal said second end;
a second sensor detecting said at least one second timing mark, and producing
a second signal indicating detection of said at least one second timing mark; and
a control system receiving said first and second signals and determining the approximate rotational position of one of said first and second ends relative to the other of said first and second ends.

22. The conveyor drive assembly as in claim 21, including at least one intermediate drive train rotationally coupled to said shaft at a location between said first end and said second end to rotationally drive said shaft.

23. The conveyor drive assembly as in claim 22, including at least one intermediate timing mark fixed to at least one of a rotating member of said intermediate drive train and said drive shaft proximal said at least one intermediate drive train, and including an intermediate sensor detecting said at least one intermediate timing mark, said intermediate sensor producing a detection signal indicating detection of said at least one intermediate timing mark, wherein said control system receives said detection signal and calculates the rotational position of said shaft at said location relative to the other of said first and second ends.

* * * * *